United States Patent
Karabacak et al.

(10) Patent No.: US 10,605,935 B2
(45) Date of Patent: Mar. 31, 2020

(54) OCEAN BOTTOM SENSING SYSTEM AND METHOD

(71) Applicant: Fugro Technology B.V., Leidschendam (NL)

(72) Inventors: Devrez Mehmet Karabacak, Leidschendam (NL); Martin Farnan, Leidschendam (NL)

(73) Assignee: Fugro Technology B.V. (NL)

( * ) Notice: Subject to any disclaimer, the term of this patent is extended or adjusted under 35 U.S.C. 154(b) by 0 days.

(21) Appl. No.: 15/742,339

(22) PCT Filed: Jul. 8, 2016

(86) PCT No.: PCT/NL2016/050508
§ 371 (c)(1),
(2) Date: Jan. 5, 2018

(87) PCT Pub. No.: WO2017/010875
PCT Pub. Date: Jan. 19, 2017

(65) Prior Publication Data
US 2018/0196152 A1    Jul. 12, 2018

(30) Foreign Application Priority Data
Jul. 10, 2015   (NL) .................................... 2015151

(51) Int. Cl.
*G01V 1/20*     (2006.01)
*G01V 1/22*     (2006.01)
*G01V 1/38*     (2006.01)
*G01H 9/00*     (2006.01)

(52) U.S. Cl.
CPC .............. *G01V 1/201* (2013.01); *G01V 1/226* (2013.01); *G01V 1/3852* (2013.01); *G01H 9/004* (2013.01)

(58) Field of Classification Search
CPC ...... G01V 1/226; G01V 1/3852; G01V 1/201; G01H 9/004
USPC .......................................................... 367/15
See application file for complete search history.

(56) References Cited

U.S. PATENT DOCUMENTS

| | | | |
|---|---|---|---|
| 4,725,990 A | 2/1988 | Zibilich, Jr. | |
| 6,211,964 B1 | 4/2001 | Luscombe et al. | |
| 6,269,198 B1 | 7/2001 | Hodgson et al. | |
| 7,079,253 B2 * | 7/2006 | North-Morris | G01M 11/31 356/454 |

(Continued)

OTHER PUBLICATIONS

International Search Report and Written Opinion; PCT Application No. PCT/NL2016/050508; dated Sep. 29, 2016.

*Primary Examiner* — Daniel L Murphy
(74) *Attorney, Agent, or Firm* — Polsinelli PC

(57) ABSTRACT

A system for ocean bottom sensing for performing geological survey. Herein the system comprising a cable further comprising a cable jacket (9), at least one optical fiber (6), and a plurality of detectors enclosed by the cable jacket (9). The latter including at least a first and a second detector (1, 2), the at least first and second detector (1, 2) comprising at least one intrinsic fiber optic sensor (3x, 3y, 3z, 3h, 3g, 3t). The detectors are communicatively connected to the at least one optical fiber (6) for allowing interrogation of the intrinsic fiber optic sensors (3x, 3y, 3z, 3h, 3g, 3t) and the cable jacket (9) has substantially a same cross-sectional diameter (D) and same outer shape at the at least first and second detector (1,2) and in between said first and second detector (1,2).

15 Claims, 4 Drawing Sheets

(56) References Cited

U.S. PATENT DOCUMENTS

2008/0123467 A1     5/2008   Ronnekleiv et al.
2009/0265111 A1* 10/2009   Helwig ................ G01V 3/083
                                                                                                 702/7

* cited by examiner

OCEAN BOTTOM SENSING SYSTEM AND METHOD

CROSS-REFERENCE TO RELATED APPLICATIONS

This application is a national stage application of International Application No. PCT/NL2016/050508, which was filed on Jul. 8, 2016, which claims priority to Netherlands Application Number 2015151 filed on Jul. 10, 2015, of which is incorporated by reference in its entirety.

FIELD OF THE INVENTION

The present invention is directed at ocean bottom and maritime sensing systems for geological survey.

BACKGROUND

Seismic geological surveys for underwater exploration, especially those in large water depths, is conducted by placing recorders on the seafloor as it provides the detector units to pick up on geological signals which would have been lost by transmission through the sea and/or which through shear waves would be rendered indistinguishable from background events. Additionally, the seafloor provides a stable environment, isolated from sounds, surface waves, temperature fluctuations and background noises which can interfere with the detection of geological events, allowing for high precision geological surveying. In the current state of technology ocean bottom sensor units for ocean bottom investigation are often positioned and retrieved individually, wherein each individual ocean bottom sensor unit is required to be fitted with an onboard power supply, clock, interrogation system, memory and positioning systems. Ocean bottom sensors aboard the ocean bottom sensor unit can be interrogated by an onboard interrogation unit which is powered by an onboard power source. It is common that onboard ocean bottom sensors are electrical and are, therefore, required to be powered by said onboard power source.

One of the disadvantages arising from individual deployment of ocean bottom sensor units and the use of electric sensors is that each unit is required to be fully self-sufficient, resulting in high equipment costs providing such self-sufficiency. Individual deployment further results in a high risk of loss of individual sensor units. Disadvantages concerning operation are possible discrepancies due to challenges in sufficiently precise time-synchronization between recorder units. Further disadvantages during deployment and retrieval is the requirement of accurate placement of each recorder node individually by remotely operated vehicles (ROVs) or autonomous underwater vehicles (AUVs) which is time consuming and costly.

Additionally, the use of electrical sensors involves high power consumption and a high susceptibility to electrical failure due to the presence of salt water conditions.

In other current systems multiple sensor units for ocean bottom sensing are joined by means of a rope or cable to enable rapid deployment and retrieval. Units in such systems may collectively share an energy source. However, these setups do not necessarily overcome the high operational energy demand as presented within self-sufficient sensor units. As energy losses occur through wiring and due to signal losses, sensor energy demand is often higher than would be the case when the sensor would be placed in closer proximity to a recorder device. Disadvantageously these setups many times require a direct surface side power supply due to the high energy need, or AUVs to provide such power. The systems with rope connections are limited in deployment depth due to difficulties in controlling deployment. Moreover, such systems are often susceptible to entanglement issues during deployment and retrieval. Hence, mechanical failure due to said entanglement issues and short circuiting due to additional electrical cabling are common. There is thusly a need for an ocean bottom sensing system which prevents the occurrence of entanglement issues and increases the deployability of its system, while overcoming the abovementioned disadvantages.

SUMMARY OF THE INVENTION

It is an object of the present invention to improve the deployability of ocean bottom ocean bottom sensing system for geological survey and to at least overcome or reduce the occurrence of entanglement issues and the disadvantages of the prior art.

To this ends there is provided herewith a system for installing on an ocean bottom for ocean bottom sensing for performing geological survey. The system comprises a cable, and said cable comprises at least one optical fiber, a plurality of detectors for detecting vibrations, and a cable jacket extending in the longitudinal direction of the cable. The plurality of detectors comprises at least a first and a second detector. The at least first and second detector comprise at least one intrinsic fiber optic sensor. The detectors are communicatively connected to the at least one optical fiber for allowing interrogation of the intrinsic fiber optic sensors. The detectors are radially enclosed by the cable jacket of the cable.

The radial enclosing of the detectors by the cable jacket reduces entanglement issues and prevents sensor loss. As may be appreciated, due to the sensors being encompassed by the cable jacket, upon pulling of the cable past ocean bottom structures such as subsea rock formations, the risk of entanglement or the cable becoming stuck is diminished. The cable jacket having a regular shape that covers any variations in size and dimension of the elements enclosed thereby, allows guiding of the cable in full past such structures. Also the risk of becoming entangled in 'midwater', e.g. due to the cable inadvertently coming in contact with anything present in the water, is reduced because of the reduced risk of hooking or becoming stuck. Moreover, if the cable would become stuck, the cable jacket protects the cable from breaking. Thus the risk of loosing part of the cable including the costly equipment therein is reduced.

In accordance with an embodiment of the invention the cable jacket has substantially a same cross-sectional diameter (D) at the at least first and second detector and in between said first and second detector. In the present invention the substantially same cross-sectional diameter at the at least first and second detector and in between said first and second detector is considered to include a diameter variation within a range of 0-10% in the direction across the length of the cable. Designing the cable in accordance with this embodiment further reduces the risk of becoming stuck. For example, in case the cable is pulled through a notch or narrowness of a rock formation that has a similar width as the cable, the mere fact of having a more or less same diameter prevents the thicker parts of the cable in becoming stuck. Similar advantages are achieved by means of some further embodiments, wherein the cable jacket further comprises a same cross sectional shape at the at least first and second detector and in between said first and second detector.

To enable the system to be installed on the bottom of a sea or ocean, the system has a weight such that it counteracts the buoyancy of water of the sea or ocean to enable the system to sink. In the present invention the intrinsic fiber optic sensor based detectors can be interrogated remotely via the optical fiber. The latter can be done by means of a data acquisition unit comprising an interrogator. The use of intrinsic fiber optic sensors avoids or, at least, minimizes the use of energy consuming electrical sensors, thereby making the system a passive or, at least a semi-passive system. Intrinsic fiber optic sensors further provide the advantage that due to their non-electrical nature they are not sensitive to short circuiting and thus less prone to failure in sea water. Moreover, the remote interrogation allows miniaturization of the detectors such that these can fit inside the cable jacket.

The use of miniaturized detectors in the cable allows the overall cable diameter to be reduced, which leads to the decrease in weight and size, which improves handling of the cable. This results in cables weighing less, allowing cables to be longer because the weight which the cable is required to carry during deployment is reduced. Furthermore, cables of a smaller overall diameter generally experience less axial torsion than their larger diameter equivalents. A lower cable weight and a reduced overall diameter enables cables to be longer than their larger diameter equivalents because more cable length can be reeled onto a same drum or drums (such as ones used by transport vessels, and packed into the transportation containers). Furthermore, by reduction of total average cable diameter the drag of the cable in a fluid can be both minimized and homogenized. As such, this reduced constant diameter cable eliminates the issues of misalignment of the cable with respect to its target location due to sideways se currents during deployment. By keeping the cross sectional diameter of the cable jacket substantially the same across its length, i.e. at least both at the first and second detector and in the cable section there between, the cable has significantly less risk of entanglements both on deployment vessel deck and during the retrieval. The homogeneity due to the uniform diameter of the cable further reduces the occurrence of entanglement issues which arises due to undesired effects of water currents on the cable. Moreover, having a same diameter across its length prevents the cable from becoming stuck behind any structure or rock formation. Thus, entanglement problems are effectively resolved during deployment and retrieval of the cable, e.g. from a vessel. Pull and cable torsion arises from the movement of the cable, as the cable naturally twists and turns as it moves through the water. Cable torsion and pull can lead to the straining of the cable to the point of mechanical failure, or failure of the equipment. The uniformity of the cable greatly reduces the pull and torsion on the cable, and thereby effectively reduces the occurrence of mechanical failure due to the effects of pull and cable torsion. A lower occurrence of mechanical defects also reduces inspection time during deployment and retrieval, thereby improving deployability.

Additionally, the use of fully integrated fiber optic sensors in the above described configuration allows for very long length recorder cables to be formed without any intermediate connectors or electrical solders, both of which are well known in the field to be the major source of signaling failures due to seawater penetration. In the invention disclosed here, this issue is circumvented by use of fiber optic splicings that are integrated to the cable inside its jacket and therefore both protected from outside and even in the event of water penetration not affected.

In combination with any embodiment the cable jacket fully radially encloses any sensors, detectors, wires and signaling cables such as fiber optic cables. The advantage of full radial enclosure is avoidance of sensor loss due to accidental detachment of sensors or detectors at the sea bottom or during retrieval operations.

In accordance with some embodiments, the cable comprises at least one of a filler material or an internal support structure in between the at least first and second detector, for maintaining said same diameter of the cable. This allows the cable to maintain the same diameter under various conditions, such as different ambient pressures or twists or turns in the cable, and benefits arising from such a same diameter of the cable are maintained as well.

In accordance with other embodiments, the invention provides a system with a plurality of detectors spaced apart at a distance range of less than 100 meters, preferably shorter than 50 meters, and even more preferably shorter than 25 meters. The lower limit of detector spacing is determined by the size of the detectors in longitudinal direction. The cable of the system may comprise a length that is in essence equivalent to the amount of detectors contained within it, e.g. the cable can extend from anywhere between 25 meters to several kilometers in length. The benefit of using optical interrogation is that the length of the cable can be in the order of several kilometers while preserving the quality of the interrogation signal. Furthermore, the use of the fiber optic technology in this setup allows for high quality data without interference so that large densities of sensors can be arranged with minimal cabling needs. The advantage of a high sensor density across the length is that this allows for more data to be collected from a relatively small area. Thus the measurement resolution (data per unit area) is larger and the increased statistics of the measurement renders it more accurate. Also, an occasional failing sensor within the system will have less impact on the overall measurement, because the correctly functioning neighboring sensors are at close distance from the failing sensor and hence the 'dark spot' (i.e. the area that is not covered by a correctly working sensor) will be smaller (e.g. as compared to conventional systems having sensors deployed with 250 meters distance between the sensors). Due to the increased sensor density the amount of data concerning an area collected per unit of time is higher. Should a lesser amount of data be sufficient, it follows that the measurement will be completed in a shorter time frame.

In accordance to other embodiments, the system further comprises a data acquisition unit for the gathering and storing of the data measured by the intrinsic fiber optic sensors. The data acquisition unit comprises an interrogator that, preferably, comprises a multi-wavelength sweeping laser associated with the interrogation of the intrinsic fiber optic sensors. The interrogation of the sensors by means of a multi-wavelength sweeping laser avoids interference of sensor signals, given that the sensors operate at different wavelengths. This allows for interrogation of an array of sensors remotely by means of the same data acquisition unit. The multi-wavelength sweeping laser can be powered from a power supply (e.g. a battery) included in the data acquisition unit, without the need for powering from a vessel or ashore. Remote interrogation using an optical signal from the multi-wavelength sweeping laser overcomes the application of sensor local interrogation elements typically needed for electronic sensors (amplifiers, analog to digital converters, filters etc.), allowing miniaturization and reducing the bulkiness of sensors. Furthermore, the multi wavelength sweeping laser is a high speed optical interrogation tool and possesses switching capability between sensors via sweeping through wavelengths. Applying high speed optical interrogation tools with switching capability such as a multi-wavelength sweeping laser, among other, allows for the recording of a large array of sensors using shared electronics which results in reduced power needs for the entire system. Additionally, the benefit of using optical signals is that such signals travel with minimal losses through the optical fiber and the intrinsic fiber optic sensor technologies such as Fiber Bragg Gratings or Fabry Perot interferometers allow for passive transducers to be used that require no electrical power at the sensor locations, the entire (seismic survey) system improves overall power efficiency. Thus, this allows for the interrogation with a reduced energy requirements to the point that a battery can satisfy the energy demand for the entire system for an extensive period of operation. This results in a fully autonomous unit without the need for a surface side connection such as a vessel, a platform or a diesel power buoy, or an AUV as power supply. Further, the absence of local interrogation (i.e. interrogation near the sensors) allows for the sensors to be scalable to fit inside a cable of uniform diameter of which the advantages have been already discussed.

More specifically in some embodiments the at least first and second detector comprise of at least one of an accelerometer, a hydrophone, a thermometer, a pressure sensor, and a geophone. These specific sensors may typically be applied for providing all sorts of ocean bottom sensing capabilities, e.g. such associated with ocean bottom sensing and in particular to geological survey. Wherein accelerometers can be equipped in such fashion to be able detect their displacement in all three dimensions of motion, which provides direct information on the motion of the geological layer the system is placed on and wherein hydrophones can actively pick up echoes and sound reflections from varying geological layers beneath the surface upon which they are placed, which data gives information on the geological structure of its deployment location. The cable which is specifically arranged for positioning on the ocean bottom is further arranged for direct coupling to the ground of present detectors. This allows for the detection of out-of-plane movements as well as shear waves by the sensors in the cable. Seismic signals from out-of-plane movements as well as shear waves are typically lost in transmission through a water body such as a lake, sea or ocean or other water bodies. The added benefit is here that the sensors in this embodiment are able to detect seismic signals from out-of-plane movements as well as shear waves where other systems do not.

Even more specifically according to some embodiments the intrinsic fiber optic sensor is at least one of a Fiber Bragg Grating (FBG), a (fiber optic) interferometer, a fiber laser, a multicore fiber, a Fabry Perot sensor or microstructured fiber sensors. Here the Fiber Bragg Grating is a type of distributed Bragg reflector constructed in a short segment of optical fiber that reflects particular wavelengths of light and transmits others. Such sensors are found particularly useful to the application as they are sensitive to strain and to temperature. By means of their arrangement inside a detector a physical occurrence or state can result in the stretching of the Fiber Bragg Grating. Difference in stretching of the grating results in a difference in the reflection and transmission spectrum and hence the magnitude of the occurrence is measurable by analyzing the reflection or transmission spectrum of the grating. Several forms of interferometers can be designed as transducers to detect transmission or reflection changes indicative of physical effects like pressure, temperature, sound or vibration. Multi-core fiber optic sensors have transmission spectra that can be analyzed to determine the strain and temperature at locations. Fiber lasers emit different spectra laser light in response to strain and temperature upon specific illumination (optical pumping).

Even more specifically according to some embodiments the data acquisition unit further comprises a controller and a communications system, wherein the controller is arranged for the detection of sensor impairments via communication with the interrogator unit, wherein the controller is communicatively connected to the communications system for the transmission of, at least, a signal related to the detected sensor impairment. The advantage of such a setup is the ability to detect impairment of sensors and the ability to communicate such impairment so that the system can check itself for broken equipment or detector units before and after deployment or during data acquisition. If the system fails or if a sensor fails, the controller is hence capable of directing a signal to a surface vessel or a subsea scanning system (for example deployed on an ROV or AUV that scans for such signals and relays them to the main vessel) in order to avoid time lost on deployment or keeping it deployed while in effect the system experiences defective sensors. The signal which is transmitted is preferably an acoustic signal as to travel through water effectively.

In accordance with some embodiments, the cable also comprises at least a first density region and at least a second density region, and wherein the density of the first density region is higher than the density of the second density region. The advantage is that the cable regions with the higher density location find better coupling to the ocean bottom due to the presence of a lower density region. The cable in its resting location will flexibly adjust to have the high density regions couple to the ocean bottom, wherein if the cable were of uniform density, coupling is determined by many other factors. With uniform density, the coupling may occasionally even be better with cable sections that are in between sensor locations, thereby disturbing the measurement for example by carrying vibrations from locations outside desired measurement location or from adjacent measurement locations to the specific detector such that cross-talks occur. For example, the locations at which the system couples to the ocean may be determined by the relief of the resting location.

In continuation of the previous embodiment in some embodiments, the at least first and second detector are arranged such that a first density region comprises the detectors and the second density region comprises the volume in between detectors and at least partially the at least one optical fiber between the detectors. The advantage of this the direct and robust coupling of specifically the part of the system containing the sensors which will increase the quality of the seismic data without the need for entrenching or mechanical anchoring of the system to achieve robust coupling of the sensors with the ocean bottom.

In accordance to some embodiments, the controller is further arranged for controlling the release of a buoyancy element connected by a cord, wherein the communications system is further arranged for receiving a release signal related to release of the buoyancy element, wherein the communications system is communicatively connected to the controller for at least one of the transmission of a signal related to detected sensor impairment and the controlling of the retrieval deployment system, and wherein the retrieval deployment system comprises the buoyancy element, wherein the buoyancy element comprises a rope and a buoy. The advantages of this embodiment is that the system becomes retrievable by a surface side vessel without the need for a diving system to retrieve it from the ocean bottom. As per one example the system can be winched up by a deployment vessel via the attached cable. In this example the rope is a strong light weight cable such as ultra-high-molecular-weight polyethylene (UHMWPE) fibers i.e. Spectra™, Dyneema™ (both manufactured by DSM, in Geleen, The Netherlands), and aramid fibers i.e. Kevlar™ (manufactured by DuPont, in Richmond, Va., United States of America) or light weight high strength steel cables that can support its own weight in water and can support the systems weight, wherein the buoy can be self inflatable and be of sufficient size to achieve buoyance with the cable attached to it. Alternatively the buoy can also rise partly to the surface and a vessel could optionally retrieve the system by means of a hook or grappling system in use by the vessel to grapple the buoy and after winch the system up. The advantage here too is that the system does not require to be dived up and effectively reduced retrieval time and complexity hence increasing the deployability of the cable.

In accordance with a second aspect, the invention provides a first method for the deployment of an ocean bottom sensing system for performing geological survey, wherein the ocean bottom sensing system comprises a cable, the method comprising the steps of: releasing the cable from the vessel, preferably as the vessel is moving forward in such a speed that in combination with the release speed of the cable, the said cable remains under a tension suitable for deployment. Deployment in this method is linear, the cable being deployed in a straight line. The added benefit of retaining a high cable tension during deployment is increased control during deployment phase as due to the tension on the cable alignment in the direction of the vessel is accomplished along the length of the cable. The vessel is further moving in accordance with deployment of the ocean bottom sensing system with the desired installation location; and installing the cable at the ocean bottom. Installing the cable at the ocean bottom includes sinking while it is being towed by the vessel and laying it to rest at the desired installation location. The cable comprises: a cable jacket; at least one optical fiber; and at least first and second detector enclosed by the cable jacket, including at least a first and a second detector, the at least first and second detector comprising at least one intrinsic fiber optic sensor, wherein the detectors are communicatively connected to the at least one optical fiber for allowing interrogation of the intrinsic fiber optic sensors, wherein further the cable jacket has substantially a same cross-sectional diameter D and same outer shape at the at least first and second detector and in between said first and second detector. The benefits relating to deployment of the cable, which includes the releasing of the cable from a vessel and installing the cable at the ocean bottom, are discussed to arise mostly from the resulting cable diameter uniformity and that this method has the benefit of having resolved nearly all entanglement issues and reduces the occurrence of issues such as mechanical failure during deployment due to undesired side currents and damage by entanglements with for example rock formations at the ocean bottom.

In continuation and in accordance with a further aspect, the invention in yet another method includes that the data acquisition unit and its housing is designed in shape and weight such that when the said step of releasing is performed by first releasing the data acquisition unit in that it acts as an anchor for the system. The benefit is that providing the system with an anchor is that the system effectively is secured against shifting during deployment. Having the data acquisition unit act as an anchor unit further provides additional friction at the first deployed end of the cable to which the acquisition unit is attached increasing cable tension due to added friction with the surrounding water medium, the friction further aiding the linear deployment of the system. Other benefits include that even if shifting occurs during or after deployment the location of the systems data acquisition unit remains fixed, which means that the location of the anchor is reliably known and the system can always be found back by tracing back the anchoring location, which has the added benefit that the system can always be found if the anchoring location is known.

In continuation and in accordance with a further aspect, the invention in yet another method includes that the ocean bottom sensing system comprises a plurality of cables, and wherein, prior to said releasing, at least one or more of said cables are interconnected by means of one or more interconnection cords (701) for forming a cable chain. This has to the added benefit that multiple cables can be deployed at the same time, further benefits include that an entire ocean bottom sensing grid can be deployed without the need to deploy each ocean bottom sensing system separately. This saves time and eases the deployment and retrieval of a plurality of systems. In one example such a grid can form multiple systems deployed in anti parallel fashion to form a grid where in between each system is connected to another system by means of the high strength cords such as but not limited to UHMWPE fibers such as Spectra™, Dyneema™, or aramid fibers such as Kevlar™ or steel cords.

In continuation and in accordance with a further aspect, the invention in yet another method includes that the ocean bottom sensing system is retrieved by the vessel, said method comprising: transmitting, by the vessel or from an accompanying underwater vehicle, a release signal to the system for releasing a buoyancy element; locating, from the vessel, the buoyancy element released by the system; and retrieving the system via a rope made out of cords attached to the buoyancy element and the system.

The advantage of this method is that the method increases the retrievability of the system on demand by the release of the buoyancy element which allows for more easy recovering of the system. The system can be winched up to by the attached rope to the vessel, such a rope being made out of high strength rope or cords such as but not limited to Spectra™, Dyneema™, Kevlar™ or steel. The transmitted signal here preferably constitutes an acoustic signal such as an acoustic ping.

In accordance to the second aspect of the invention describes in continuation of the previous method a method, wherein the ocean bottom sensing system is positioned on the ocean bottom in a first area thereof, and, after performing a measurement using the system, retrieving the system and redeploying the system in a second area on the ocean bottom. The advantage of this method is that the system has an increased mobility in a way that it can be retrieved to be deployed elsewhere and faster compared to systems which are more durably or permanently placed on the ocean bottom and that it has a longer autonomous operation time compared to electrical ocean bottom sensing systems such that fewer charging cycles are needed and as such fewer systems are required to survey a specific area with shorter operation times.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Embodiments of the invention relate to ocean bottom sensor systems, as well as deployment techniques thereof.

Figure 1:
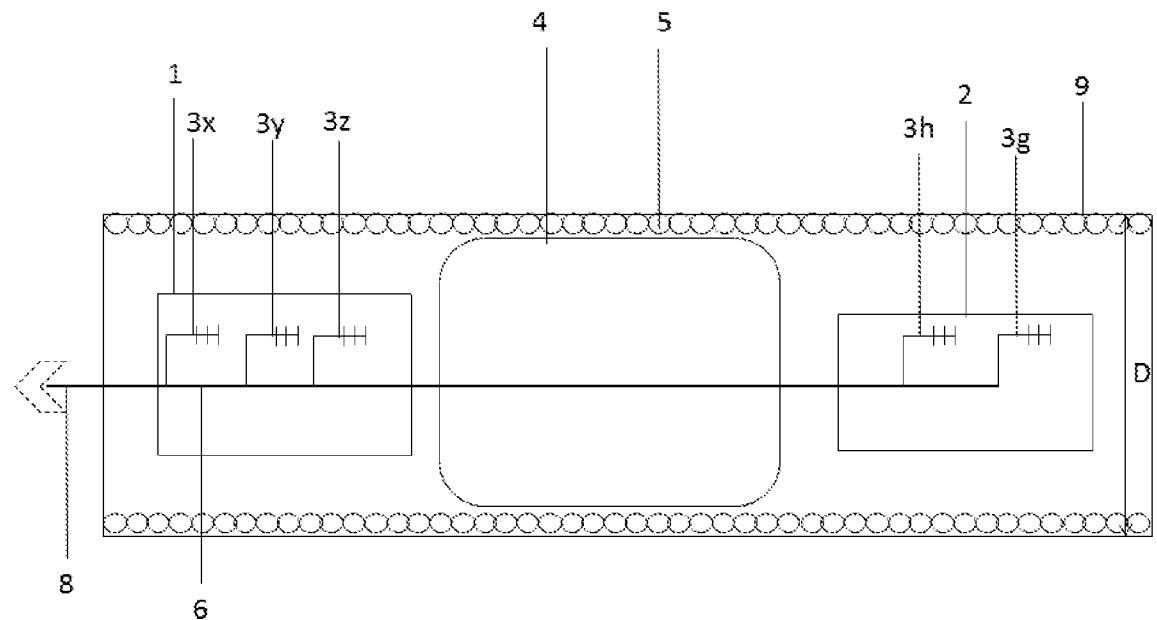
FIG. 1 illustrates a cross-sectional view of a part of a cable as per an embodiment in the ocean bottom sensing system.

In one embodiment, the invention relates to an ocean bottom sensing system (OBS) which can be used for ocean bottom sensing. In this embodiment the system comprises a cable such as seen in FIG. 1, wherein at least a first and a second detector (1, 2) are present, further comprising intrinsic fiber optic sensors (3*x*, 3*y*, 3*z*, 3*t*, 3*h*, 3*g*). The sensors can be, for example, Fiber Bragg Grating (FBG) accelerometers (3*x*, 3*y*, 3*z*), FBG hydrophones (3*h*), FBG geophones (3*g*), FBG pressure meters, and/or other intrinsic fiber optic sensors such as for temperature (3*t*). The sensors are connected to an optical fiber (6) for the interrogation thereof through the exiting optical fiber bundle (8) which comprises the optical fiber (6). Alternatively each sensor can be connected to an individual optical fiber (6) and more preferably sensors belonging to each specific detector can be connected to a fiber optic cable per group (6*a*) as presented in FIG. 2 such that the sensors in each measurement point are on one fiber (6) but with different spectral response characteristics shifted, for example by wavelength multiplexing, in such a way to allow for their interrogation in one line. FBG used in this invention allows for a large number of transducers of this type to be built in an accurately wavelength multiplexed configuration such that depending on the wavelength received back from the fiber (6) the sensor can be uniquely identified.

In an alternative embodiment, the wavelengths of the sensors are pre-selected such that multiple sensors (3*x*, 3*y*, 3*z*, 3*h*, 3*t*, 3*g*) in a first detector unit (1) are connected to a sensor fiber in series and the same sensor fiber reconnects to the main line (8). The main line is an alternative equivalent to the optical fiber bundle. The main line is an optical fiber (6*a*) such that any sensors (3*x*, 3*y*, 3*z*, 3*h*, 3*g*, 3*t*) in a neighboring (next station) detector unit (2) can also be connected to the same fiber (6*a*). Several detector units are chained in single fiber in such manner whereby their reflection wavelengths allow for their unique identification.

Figure 2:
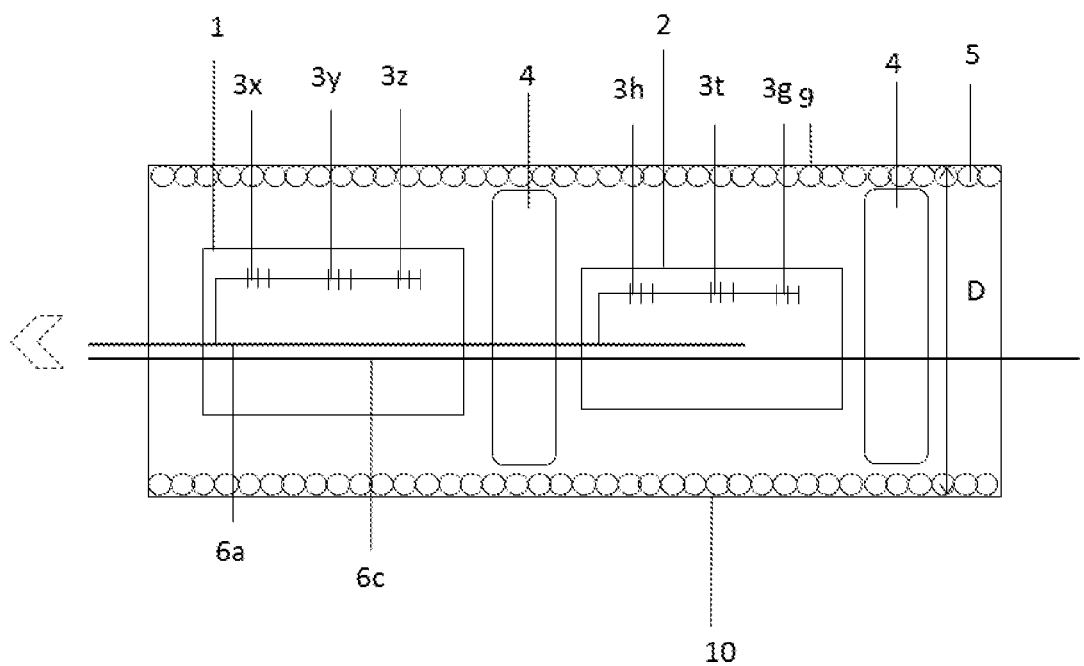
FIG. 2 illustrates a cross-sectional view of a part of a cable as per yet another embodiment in the ocean bottom sensing system.

In an alternative embodiment of densely packed sensors on individual fibers, sensors from multiple detector units can be partially reflective on the same wavelengths with sufficient signal transmission to allow for interrogation of multiple sensors but located sufficiently apart such that their unique identification can be obtained by a combination of signal travel time and their wavelength signatures. A pulse of light will be sent out from the interrogator and the reflections will be timed to correlate the distance from the source to the sensor to identify the sensor (3*x*, 3*y*, 3*z*, 3*h*, 3*g*, 3*t*) and the corresponding detector unit (1,2). Alternative sensor distributions from the embodiments of FIG. 1 and FIG. 2 are feasible and setups are feasible wherein not all presented sensors are present.

In yet another embodiment, the cable has one or more optical fiber bundles (8) for general communication that split out periodically over the length of the cable into local fibers (6) to which sensors (3*x*, 3*y*, 3*z*, 3*h*, 3*g*, 3*t*) are connected in a region of the cable (10) and rejoin to the one or more optical fiber bundles (8). As such, many fibers can be tightly packed into a small bundle, with each fiber and the one or more sensors on each fiber being individually recordable from the interrogation unit. In this embodiment, the cable jacket (9) is constructed out of a flexible plastic material such as polyurethane. However, other known durable and flexible materials can also be considered. Here the cable is presented with a structural reinforcement (4,5) such as a plastic or metallic spiral (5) stretching throughout the inner structure of the cable. Such a spiral offers resistance against radial forces and external pressure as well as rough handling during deployment without damage to the sensors. Alternatively, the structural reinforcement (4, 5) can be placed specifically in areas requiring such reinforcement such as in the part of the cable in between detectors (1, 2), another support structure present in this embodiment is a filler material (4) which is present in between the detector units. The filler material here is added to provide additional internal support to resist deformation of the cable in between detectors (1,2) during deployment, retrieval and its operations as an ocean bottom sensing system as well as isolate the measured physical effects between detector locations, such that cross-talks are minimized. Alternatively, the system does not comprise a filler material for providing additional internal support. In the embodiment the filler material (4) is a fluid such closed pocket foams that isolate vibrations and pressure waves to transmit between the sensor locations. Alternatively, this filler material can also be flexible low density plastic, plastic grains, inert fluids or other light weight filler materials.

In a further embodiment, the space between the first and second detector unit (1,2) and the cable jacket (9) and protective layer is filled with gel or oil, preferably index matched to the environment (sea water) such that acoustic waves coming in contact with the cable 10 are transmitted to the inside of the sensors (3*x*, 3*y*, 3*z*, 3*h*, 3*g*, 3*t*) with minimal losses.

In a further embodiment, the structural reinforcement spirals (5) have more flexible openings or the spirals (5) have a predetermined (index matched) softer material (periodically placed) between the spirals (5) such that sound is transmitted with even less losses, these are acoustic transfer windows. The dimensions of flexible acoustic transfer windows are arranged such that they provide sufficient flexibility to allow for transfer of sound and for the bending of the cable and have a rigidity sufficiently high for the acoustic windows to provide protection against forces acting on the cable.

In yet another embodiment, the cable additionally includes a metal cable, preferably steel, that acts as a reinforcement member that carries the weight and tension of the cable. In a further embodiment, the sensors in the detector units are attached to the reinforcement member.

In a preferred embodiment, the sensors are attached to the reinforcement member with an isolating layer for acoustics between the sensor and the reinforcement member, also known as a center cable, such that the vibrations in the center cable are not coupled to the sensors to avoid cross-talk between sensors and along the cable.

Sensors are, preferably, Fiber Bragg Gratings, but can alternatively also be long fiber gratings, evanescent wave sensors, a fiber laser, and/or multicore fiber. In yet another embodiment, the sensors are exclusively Fiber Bragg Gratings.

Another embodiment of the cable part of the system relates to an ocean bottom sensing system and can be seen in FIG. 2 as a plurality of cable sections (10) such as presented in FIG. 2 can be repeated to form a cable of predefined length. Here all sensors are Fiber Bragg gratings. Herein the previous embodiment is expanded to contain a large number of detectors containing a combination of intrinsic fiber optic sensors ($3x$, $3y$, $3z$, $3t$, $3h$, $3g$) wherein all sensors belonging to a certain detector are grouped to a single optical fiber (6a) exclusive for the interrogation of sensors belonging to that specific detector. Such optical fibers (6c) from adjoining cable sections can be seen crossing a cable section. Those knowledgeable in the field will know that to allow interrogations of sensors connected to the same optical fiber the sensors ($3x$, $3y$, $3z$, $3t$, $3h$, $3g$) must be designed to be interrogated at different wavelengths. The collection of all optical fibers from all cable sections (10) together comprise the optical fiber bundle (8) of which all individual optical fibers can be interrogated. Accelerometers ($3x$, $3y$, $3z$) are arranged to be interrogated in series as they are arranged in the same optical interrogation path. Alternatively, accelerometers ($3x$, $3y$, $3z$) and hydrophone ($3h$) are also fitted together in a detector, arranged to connect to the sensors single common optical fiber (6a).

Figure 3:
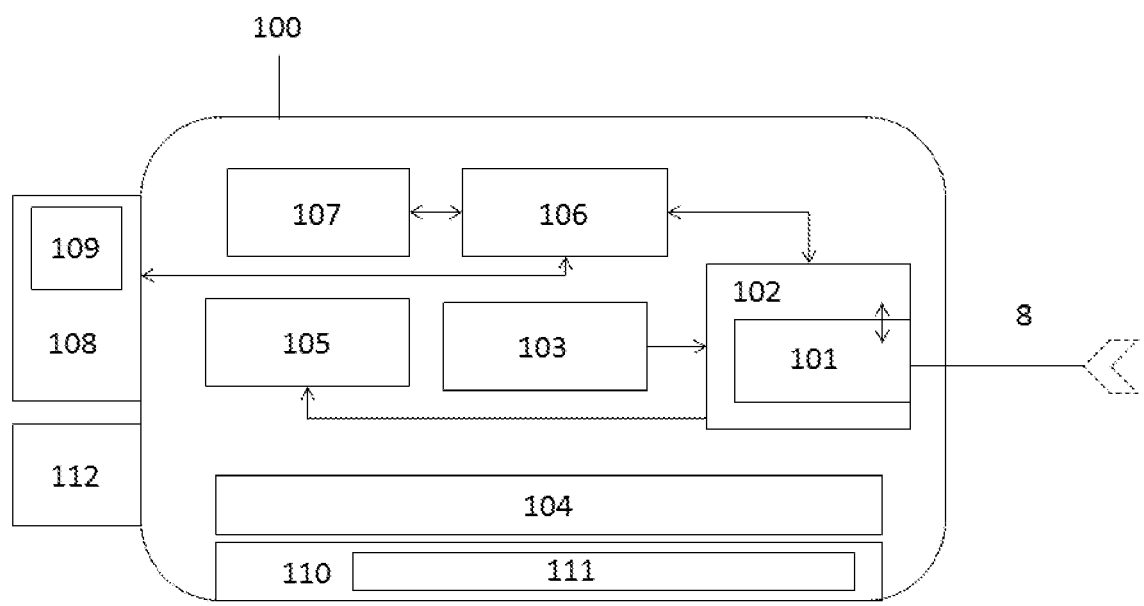
FIG. 3 illustrates a schematic drawing of the data acquisition unit as an embodiment in the ocean bottom sensing system.

In yet embodiments optical fibers (6) for interrogation of intrinsic fiber optic sensors ($3x$, $3y$, $3z$, $3t$, $3h$, $3g$) are led to a data acquisition unit (100), as presented in FIG. 3, for the interrogation thereof by means of a sweeping multi-wavelength laser source (101). Due to use of a wavelength-swept interrogation scheme (e.g., equivalent to interrogating of sensor by wavelength sweeping) time domain multiplexing methods are avoidable, which allows for faster recording times. Alternatively, when used together this allows for larger number of sensors to be interrogated in shorter overall recording time compared to systems employing multiplexing methods.

Figure 6:
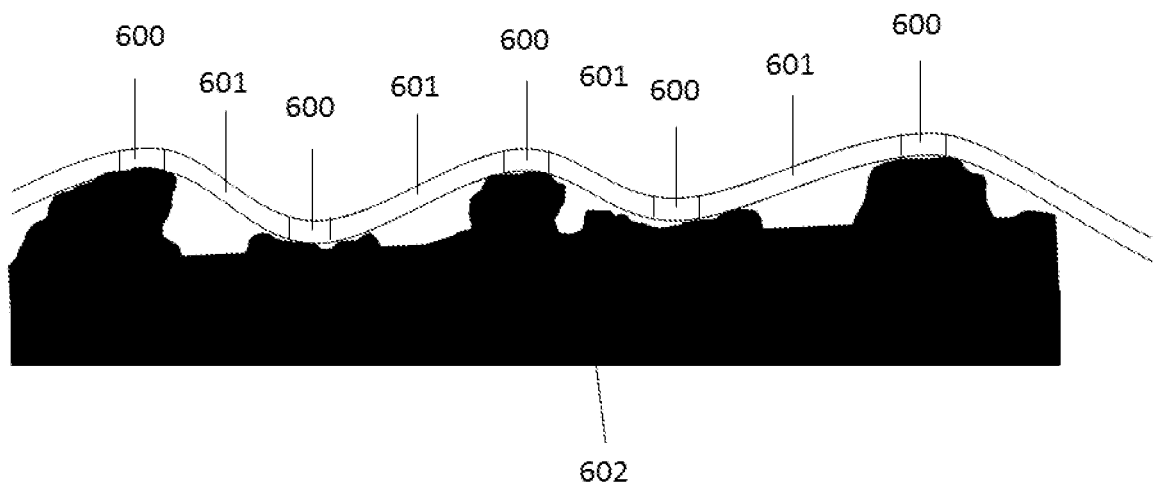
FIG. 6 illustrates a schematic drawing of an embodiment of a cable in position on the ocean bottom.

In some other embodiments, the ocean bottom sensing system further comprises a cable wherein there is a density variation in the cable. In such embodiments, the two separate cable regions can be distinguished. A first region (600) comprises the detectors and surroundings while a second region (601) comprises the volume in between detectors. The density of the first region (600) can be elevated due to the use of but not limited to metal or high density plastic components in and of relation to the detectors and direct surroundings. Further, in and around the detectors weighting materials can be used to further increase the average cable density of this first region and also improves coupling to the seafloor. Such weighting materials can be, but are not limited to, metals or high density plastics. The second region (601) comprises at least the at least one optical fiber and can also be fitted to contain low density filler materials (4), such as but not limited to low-density plastics, with the possibility to provide for an internal cable support structure in between detectors. In a preferred embodiment, it is highly desirable to reduce the average mass of the sections between the detectors such that the total mass of the system is arranged for optimizing the handling of the system by minimizing the weight of the cable and reducing the strain on the strength member during handling and deployment. Thereby reducing the strain on the cable and therefor the strength member, allowing the strength member to have a reduced diameter. In this embodiment the system is optimized for a cable which has a minimized total mass of the system, and a minimized diameter of a strength member. The overall average density of the cable is in this embodiment designed to exceed neutral buoyancy and be of a value of at least between 1.5 $kg/dm^3$-2.5 $kg/dm^3$ or higher. The resulting density difference, total average, and relatively higher density of the first region (600) over the second (601) provides that the cable, in its operations remains in its position at ocean bottom, or other maritime conditions for that matter, and has a robust coupling to the ocean bottom (602) without any anchoring or trenching of the cable. In FIG. 6 it is shown how coupling of the higher density regions of a cable occurs and how the lower density regions naturally give way to accommodate the coupling of the higher density regions.

In a preferred embodiment, the detectors (1,2) comprise a housing, wherein the sensors are contained. The housing can be sized and adjusted to comprise the desired sensors and have a desired shape and diameter corresponding with the shape of the cable. The latter can be achieved by utilizing a multi-wavelength sweeping laser eliminating the need for long path interferometry as part of the interrogation of sensors, which reduces the size of the sensors and makes them sizeable, which in turn makes the detectors sizeable to the dimensions of the cable.

In some embodiments the ocean bottom sensing system will comprise of a cable as mentioned and a data acquisition unit (100) such as can be seen in FIG. 3. Here, the data acquisition unit comprises an interrogator (102), which further comprises a sweeping multi-wavelength laser source (101). The data acquisition unit (100) further comprises a clock (103); a battery (104); and a data storage (105) associated with the interrogator. The data storage (105) can for example include a magnetic tape, a hard drive, a solid state drive, flash memory or other memory forms. The interrogator is arranged to process signals from the sensors ($3x$, $3y$, $3z$, $3h$, $3t$, $3g$) and provides the memory with observational data, the interrogator is further arranged to process data sent by the clock to provide observational data points with a time stamp. The interrogator (102) is communicatively connected to the data storage (105). Here the battery (104) substantially provides in the entire energy demand of the data acquisition unit and all its (sub-)systems. These provisions yield that the system can perform its ocean bottom sensing and record data fully autonomous from any sort of AUV or surface connection for at least the duration required to complete the systems surveying of the ocean bottom as an OBS system.

In yet another embodiment the data acquisition unit also comprises a controller (106) and a communications system (107). The controller (106) is programmable and arranged to analyze sensor data as processed by the interrogator (102) or alternatively periodically analyze the sensor data to determine the presence of defects in the sensor units or detect the structural failure of the intrinsic fiber optic sensors ($3x$, $3y$, $3z$, $3h$, $3t$, $3g$). Signs of defect could for example be the absence of a return signal upon interrogation of the sensor. The controller (106) is communicatively connected with and arranged to direct the communications unit (107) for the transmission of a signal related to the impairment of a sensor (3x, 3y, 3z, 3h, 3t, 3g). In this manner active diagnostic sensor surveillance is instated. The communications unit (107) in this embodiment arranged for the emission of acoustic signals pertaining information concerning defects. Such a signal could be received by a nearby vessel or deployment carrier which would be able to respond directly to the signal.

In a further embodiment the system comprises a data acquisition unit further comprising a connector (112) for physically connecting to external systems such as another ocean bottom sensing system. The connection between such systems can be accomplished by any joining means, such as a hook joined to the tail section of another such system designed to allow for the hooking thereof.

In one embodiment, to allow for longer autonomous recording times without the need for battery charging and replacement, power saving functions are embedded into the data acquisition unit (100). An example of such a power saving function is the function for the controller (106) to power down the interrogator unit (102) and it's associated laser source (101) for a predefined period of time or an indefinite period of time after receiving a therefor specified signal from a vessel. In one embodiment, the system is triggered with a signal from the vessel at the start of or in advance to sensing operations such that measurements may after deployment be initiated collectively by sending out a signal from a nearby vessel.

In yet another embodiment, the system is powered down except for one or more channels that continue to monitor activity in the cable such that once a seismic trigger signal is received from a seismic source upon which the controller (106) turns the remaining interrogation system fully operational.

In yet another embodiment, the system, upon receiving the trigger signal either from the seismic source vessel or by pinging, performs a system health check to ensure all or a substantially sufficient number of detectors (1,2) are fully operational. A system health check comprising interrogating the sensors sensor (3x, 3y, 3z, 3g, 3h, 3t) using the interrogation unit for a return signal, and identifying if and if so which sensors are unresponsive are yield abnormal return signals associated with a defective sensor (3x, 3y, 3z, 3g, 3h, 3t). Alternatively, in addition to or independent from any health check of the sensors the system checks if the data acquisition unit (100) is fully operational, such as by determining the laser output and checking the fragmentation of the data storage (105). Additionally to any health check, the system confirms the health check to the surface vessel or any associated supporting subsea vessels, to allow for start of seismic survey operation while ensuring sufficient recorder data quality.

In yet another embodiment, the data acquisition unit comprises a high speed interrogator with a high speed switch unit such that the interrogator allows for sufficiently fast recording to allow for switching of between fibers to allow for one optical source and photodetector unit to interrogate many fibers and therefore reduce power consumption, system complexity and cost.

In yet another embodiment the data acquisition unit (100) is further equipped with a retrieval mechanism (108), such as visible in FIG. 3, the controller (106) here is equipped and programmable to be able to direct the activation of a retrieval mechanism (108) for the retrieval of the ocean bottom sensing system by a vessel such as a ship. Such a mechanism comprises a buoyancy element (109) which is connected to the ocean bottom sensing system through a one of but not limited to a cable and rope. The communications system (107) in this embodiment is further arranged to receive a signal related to the activation of the retrieval mechanism (108), wherein the signal can be an acoustic signal. In non-activated mode the mechanism (108) and all its components are housed outside the data acquisition unit in a separate housing, but structurally attached to the ocean bottom sensing system. Alternatively, the retrieval mechanism (108) can also be housed inside the data acquisition unit (100) in a separate compartment. In the activated mode the buoyancy element is buoyant above the ocean bottom sensing system and is connected thereto by one of but not limited to a cable and rope, which extends between the location of attachment to the ocean bottom sensing system and the buoyancy element.

In yet another embodiment the data acquisition unit (100) as can be seen from FIG. 3 is further designed to withstand deep oceanic pressures by means, for example, of an increased hull thickness, wherein the hull can be a thick steel, a steel alloy and titanium, additionally, the data acquisition unit may be filled with oil, thus avoiding the additional complexity of pressure containers. Wherein those knowledgeable in the field will know the required hull thickness to withstand the pressures at operational depths. And wherein preferably the alloy chosen for the hull posses anti-oxidation properties, such as titanium or stainless steel and coated to better resist saline conditions.

In yet another embodiment, the buoyancy element (109) as can be seen from FIG. 3 comprises a buoy, which is self inflatable. Where the inflation of said buoy occurs through the collection of gasses in the buoy originating from chemical reaction which is activated by the controller upon receiving either a signal from the vessel for the release of the buoy or upon the identification of battery failure. To same end gases can also originate from a pressurized cartridge such as carbon dioxide or a compressed air tank, wherein the respective cartridges, gas tanks or chemicals are designed to be are replaceable upon servicing. The buoyancy element (109) can thus further comprise a gas producing reactive chemical or combination of chemicals which are stored separately and designed to be mixed or brought into contact to initiate the chemical reaction to the end of supplying the gas from said chemical reaction to the buoy; the buoyancy element can alternatively or in combination with the before mentioned comprise a pressurized gas cartridge, tank designed for storing pressurized gasses for release into to buoy.

In yet another embodiment the retrieval deployment system (108) is reusable and the buoy (109) can be deflated and folded to be returned to its original location in the system. Similarly the rope of the buoyancy element can be rolled up to be repositioned inside its original position inside the system. The buoyancy element can be a self inflatable buoy equipped to rise through the water without bursting carrying a high strength light weight rope which is attached to the data acquisition unit such cables materials as UHMWPE fibers such as Spectra™, Dyneema™, of aramid fibers such as Kevlar™ or steel. The buoy is able to inflate sufficiently to carry the rope up to either the surface or near the surface, where a vessel is able to collect the buoy. Alternatively the buoy is designed so as to allow for retrieval by a hook or grappling system attached to a vessel, as to enable subsurface recollection of the system. The buoy preferably fitted with a hook.

In other implementations the buoyancy element is designed to self activated upon battery failure to ensure retrievability of the system and can do so by means of a battery monitoring unit such as a battery tester.

Figure 4:
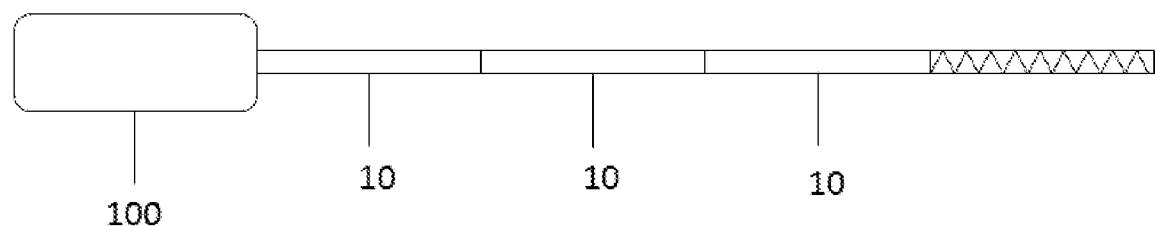
FIG. 4 illustrates a schematic drawing of an embodiment of the ocean bottom system.

FIG. 4 shows an embodiment of the system, wherein the system comprises a data acquisition unit (100) as per one of the mentioned embodiments, wherein the system further comprises a cable comprising a series of cable sections (10) per one of the mentioned embodiments. In one embodiment the cable of the ocean bottom sensing system is between 10-500 mm in diameter (D), and more specifically between 20-100 mm (D) in diameter, here detectors are spaced less than 25 m apart from another inside the cable forming a high density sensor grid. In a further embodiment the length of the cable is able to extend to several kilometers, between 0.1 and 10 km, more specifically between 1 and 5 km and even more specifically between 1 and 2 km.

Figure 5:
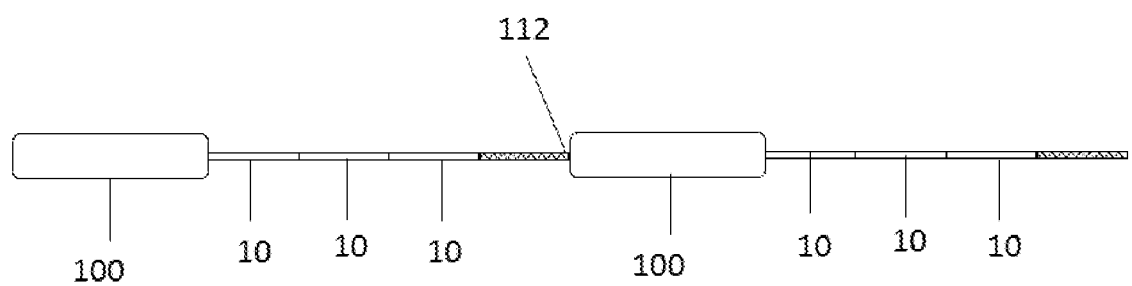
FIG. 5 illustrates a schematic drawing of connected ocean bottom systems.

FIG. 5 shows an embodiment of two systems connected head to tail by means of a connector (112) to form two systems in a linear series. The advantage of this setup is that both systems can be deployed as one system and can be collected as one. Further, during operations their combined sensing capability covers a larger length. Also, it provides higher security for retrieval, should one retrieval mechanism fail to activate. FIG. 5 describes a system comprising a data acquisition unit and a cable according to any of the preceding embodiments, wherein a plurality of systems are joined head to tail by means of a connector for the extension of the sensing length, wherein all connected systems can be retrieved by use of any of the retrieval mechanisms in any of the systems connected, wherein preferably the unconnected data acquisition unit is used to deploy the retrieval system for collection. Here it is optional that the connected systems comprise a retrieval mechanism.

Figure 7:
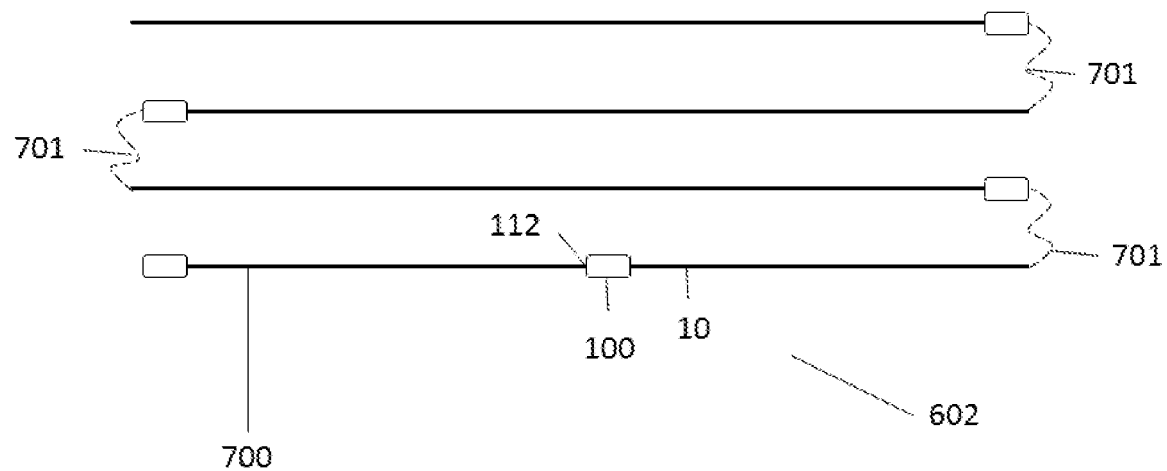
FIG. 7 illustrates a schematic drawing of an embodiment of a placement arrangement of a series of systems at an oceanic bottom.

FIG. 7 shows an embodiment wherein multiple systems are coupled and positioned at the ocean bottom. Herein some systems are connected mechanically by means of a connector (112) and other are connected by means of an interconnection rope (701) (which is made of a high strength rope, steel chain or other mechanical attachment means) forming a system chain (700) which represents a sensor grid. The system chain (700) can be deployed from a vessel in a single deployment, and can be retrieved in a single retrieval. The system chain (700) can be optimized to include systems which are specialized for their specific location in the area which is to be surveyed. Such a design has the benefit of multiple anchoring points should the data acquisition unit (100) be weighted, preventing displacement of the systems. It can further be observed that the system chain (700) is placed in parallel lines; this is in concurrence with the trajectory of the deployment vessel during deployment. The parallel line deployment is achieved by the vessel deploying in a straight line and then performing a turn for the release of another system while during the turn still deploying the attached interconnection rope (701). The interconnection rope thus leaves a certain tolerance for the positioning of the next system in the positioning of the system chain (700).

In accordance with a second aspect, the invention provides a first method for the deployment of an ocean bottom sensing system for performing geological survey the method comprises: releasing the system from a vessel and installing the system at the ocean bottom; wherein the cable comprises: a cable jacket, at least one optical fiber, and at least a first and second detector enclosed by the cable jacket. Alternatively, any other previously mentioned system can be used. The at least first and second detector (1, 2) comprising at least one intrinsic fiber optic sensor. The detectors communicate with the at least one optical fiber for allowing interrogation of the intrinsic fiber optic sensors. The cable jacket has a first cross-sectional diameter and substantially same outer shape at the at least first and second detector and in between said first and second detector. Installing of the cable comprises using density variations in the cable for the preferential coupling of the sections containing the detectors to the ocean bottom. The benefit of this method is that the use of additional coupling means for securing the cable of the ocean bottom system to the ocean bottom can be avoided. Installing the cable on the ocean bottom includes laying the cable to rest on the ocean bottom. The density variation of the cable is such that the sensors in the cable more adept to detect geological signals which would have been lost by transmission through the sea and/or which through shear waves, when the cable is installed on the ocean bottom. During deployment the cable allows for a more controlled descent as entanglement issues are avoided, further the loss of sensors is avoided by enclosing the detectors.

Figure 8:
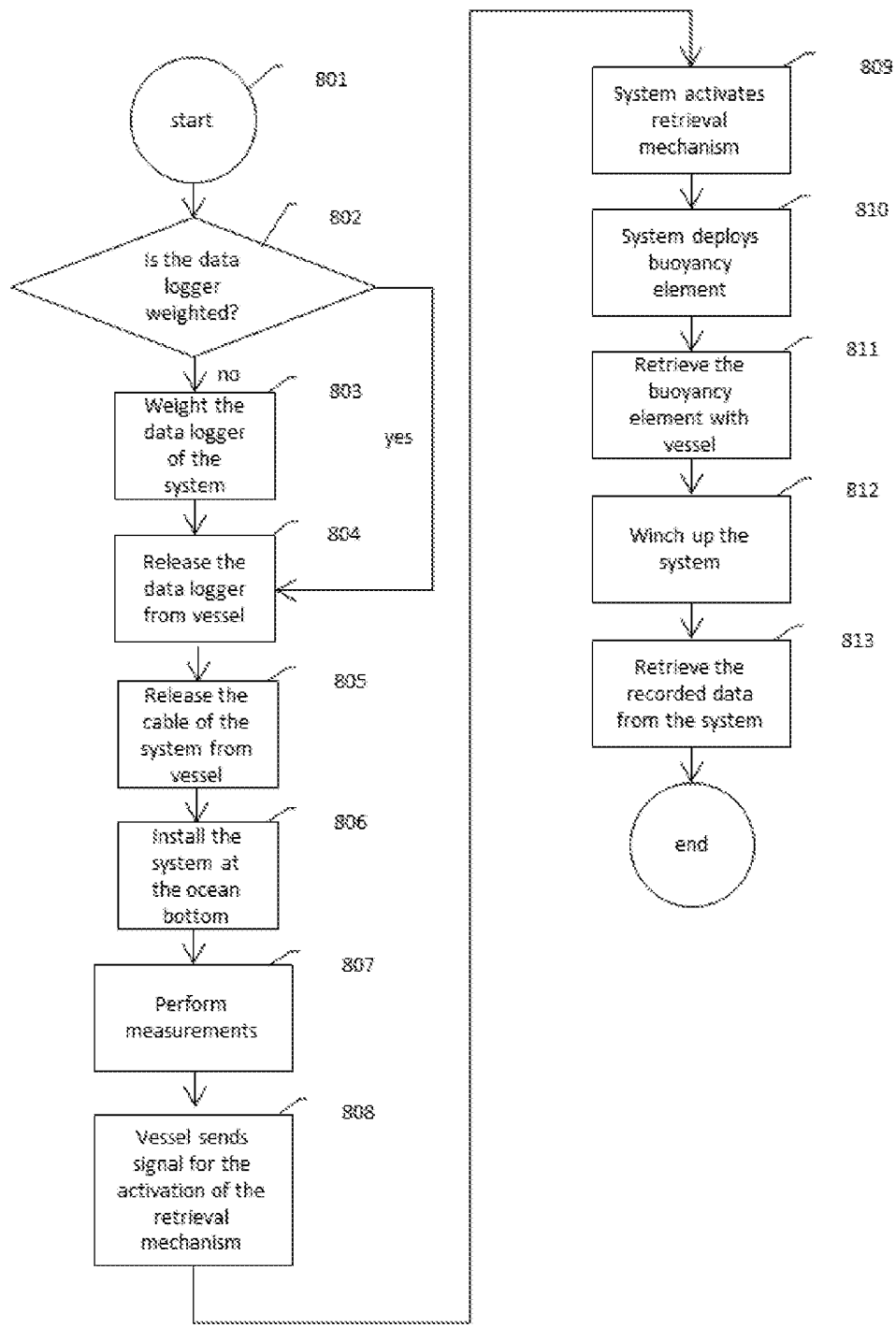
FIG. 8 illustrates the method of deployment of an ocean bottom system.

The invention provides a further method for the deployment of an ocean bottom sensing system for performing geological survey. Of this method several aspects can be seen in FIG. 8. Herein, the ocean bottom sensing system comprises a data acquisition unit and a cable, the method comprising the steps of releasing system from the vessel data acquisition unit first (804) and the cable second (805) and installing the system at the ocean bottom (806). The cable (10) comprises: a cable jacket (9); at least one optical fiber; and a plurality of detectors (1, 2) enclosed by the cable jacket. The detectors include at least a first and a second detector, the at least first and second detector comprising at least one intrinsic fiber optic sensor. The detectors are communicatively connected to the at least one optical fiber for allowing interrogation of the intrinsic fiber optic sensors. The cable jacket has substantially a same cross-sectional diameter D and same outer shape at the at least first and second detector and in between said first and second detector. Here the system can be released from a vessel (804, 805) for example by means of a winching system, releasing one end of the system first, following the rest of the system and lowering the cable linearly while the vessel maintains its horizontal speed, wherein the vessel can adapt its speed to avoid straining the cable unnecessarily due to the drag exerted on the cable as it moves through the water. The step of installing of the cable (10) at the ocean bottom (806) occurs natural by the sinking of the cable during the release of the cable as following the given procedure when it makes contact with the ocean bottom where after it couples with the ocean bottom. The motion of the vessel and that of the cable ensure a positioning along a substantially straight line or any desired path. The method further includes linearizing the deployment path of the system using the data acquisition unit as an anchor to incur drag at one end of the system thereby increasing cable tension during the deployment of the system. An advantage of this higher control during deployment and more predicable movements of the cable during the release and lowering part of the deployment of the system allowing for a reduced deployment time. And the method further comprises installing the cable using density variations in the cable for the preferential coupling of the sections containing the detectors to the ocean bottom. In this embodiment cable regions of locally lower density are flexibly adjustable to allow sections containing detectors, which are the sections of the cable with a local higher density compared to other sections of the cable, preferential coupling with the ocean bottom to the lower density cable sections. The benefit of this is that detector coupling is improved.

In another method of deployment and in continuation of the preceding the data acquisition unit is provided with additional weight, and sufficiently so as to be able to act as an anchor for the system. A weighting proceeding (803) of the data acquisition unit can be performed on site or in the factory production of the data acquisition unit. In one embodiment the data acquisition unit possesses an additional compartment for the housing of weighting materials (111). This provides with the added benefit that the weighting materials (111) are contained within the data acquisition unit such that no weighting materials (111) can be lost. In this method, as well as in yet another independent embodiment, the weighting materials as seen from FIG. 3 can be attached to the hull of the data acquisition unit by mechanical anchoring or other forms of reversible attachment. The added benefit is that such weighting materials (111) can be added on demand without the need to open any part of the data acquisition unit (100). Weighting materials (111) can be standard lead baring weights or other metals in sacks, satchels or any other form of weighting items or a combination of the former. The benefit of having the data acquisition unit (100) act as an anchor is that the placement of the system can be aided to occur in a more linear and secure fashion. As the data acquisition unit remains in a position the cable can extended and lowered over a single direction keeping the system over its length substantially aligned with the vessels path of motion. Once installed on the ocean bottom, the system can perform its measurements (807).

In yet another method of deployment the ocean bottom sensing system is retrieved by the vessel (812), said method comprising: transmitting, by the vessel, a release signal (808) to the system for activating the retrieval mechanism (809) for releasing a buoyancy element; locating, from the vessel, the buoyancy element released by the system; and retrieving the system (811, 812, 813) via a rope attached to the buoyancy element and the system. In the case of an sub-surface retrieval by a vessel, the vessel can catch the buoy by means of a hooking operation wherein the surface vessel drags a catching mechanism through the water collecting the buoy upon its passing over the release area. The vessel collects the buoy and thereby the buoyancy element (811) and the data acquisition unit first and can use winching means such as an on deck winch to roll the cable onto a winch and collect the system (812) by winching it up from the ocean bottom. The data can be collected from the system by reading the memory. In some cases the data acquisition unit could also comprise a communications device with the capacity to transmit data by means of a wired or a wireless connection to external devices for further processing. Data can thus be collected (813) from the data acquisition unit without the need for opening the system. For servicing of the battery, the battery can also be replaced or recharged before or after reading the data. The battery can optionally be housed in a separate sealed compartment which can be opened by key to be fully replaced with a charged battery, or have recharge points behind an easily accessible panel as to allow for the connecting of the power source to a recharging installation aboard the vessel such as jumper cables connected to a ship bound power source. If servicing such as mentioned is required, the system can after servicing be released over a next desired location from the winch. The added benefit is an increased deployment readiness, the rapid collection of the system, and the easy of data extraction and energy source replacement without the need to take the device apart.

In yet another method and in continuation of preceding methods a system is utilized to perform measurement of an ocean bottom region and is deployed in a first area thereof, is recollected and redeployed in a second area thereof. Wherein the system collects data from the specified ocean bottom region over the course of hours, days, weeks, or months, without the need of an extensive network or a greater number of systems. Due to the redeployability in rapid succession, fewer systems are required to collect data from a specified area. This greatly reduces the amount of required systems to collect the same amount of measurements. Alternatively, in this scope also In yet another method the ocean bottom sensing system is positioned on the ocean bottom in a first area thereof and retrieved after performing a measurement using the system. The system is then retrieved and redeployed in a second area on the ocean bottom. The deployment and release of a chain of systems is possible, wherein a multitude of systems is one of either mechanically connected or joined by interconnection rope. The redeployment of the cable has the added benefit that fewer systems are required to perform measurement of the same area as the system allows for rapid redeployment. The benefit of the cable is that the system is rapidly retrievable due to its uniformity. Interconnection ropes between systems would allow for the positioning of multiple systems at once in parallel, in series or a combination of parallel and in series, such that multiple systems can be deployed collected and redeployed in a single instance. A vessel would be able to deploy multiple systems consecutively and retrieve them consecutively with the added benefit of saving time.

The present invention has been described in terms of some specific embodiments thereof. It will be appreciated that the embodiments shown in the drawings and described herein are intended for illustrated purposes only and are not by any manner or means intended to be restrictive on the invention. Further, combinations of embodiments and combinations of methods which aren't mentioned are appreciated to be included. The context of the invention discussed here is merely restricted by the scope of the appended claims.

The invention claimed is:

1. A system for performing geological survey on an ocean bottom, the system comprising a cable, the cable comprising:
   one or more optical fibers; a plurality of detectors; and
   a cable jacket extending in the longitudinal direction of the cable,
   wherein the plurality of detectors comprises at least a first and a second detector, each of the at least first and second detector are provided by at least one intrinsic fiber optic sensor and are enclosed by the cable jacket, wherein each detector is communicatively connected to one of the one or more optical fibers, via the one optical fiber, and configured to receive an interrogation signal and return a response signal, for enabling interrogation of the at least one intrinsic fiber optic sensor, and
   wherein the plurality of detectors are spaced apart along a length of the cable, and wherein the detectors are radially enclosed by the cable jacket of the cable; and
   wherein the cable, in cable sections around the detectors, is weighted to provide first density regions at a first density; and wherein a weight of the cable is reduced in cable sections between the detectors which provide second density regions of a second density lower than the first density.

2. The system according to claim 1, wherein the cable jacket has a cross-sectional diameter, wherein the cross-sectional diameter at the at least first and second detector and in between the first and second detector comprises a variation with a percentage range of 0-10%.

3. The system according to claim 1, wherein the cable jacket further comprises a same cross sectional shape at the at least first and second detectors and in between the first and second detectors.

4. The system according to claim 1, wherein the cable comprises at least one of a filler material or an internal support structure in between the at least first and second detectors, for maintaining the same diameter of the cable jacket.

5. The system according to claim 1, wherein the system further comprises a data acquisition unit for interrogation of the at least one intrinsic fiber optic sensor, the data acquisition unit comprises an optical interrogator further comprising a multi-wavelength sweeping laser associated with the interrogation of the at least one intrinsic fiber optic sensor.

6. The system according to claim 5, wherein the data acquisition unit further comprises a controller and a communications system, wherein the controller is arranged for detection of sensor impairments via communication with the interrogator unit, wherein the controller is communicatively connected to a communications system for transmission of a signal related to the detected sensor impairment, wherein the system further comprises a connector for mechanically connecting the system to a further system.

7. The system according to claim 6, wherein the controller is further arranged for controlling release of a buoyancy element connected by a rope, wherein the communications system is further arranged for receiving a release signal related to release of the buoyancy element, wherein the communications system is communicatively connected to the controller for at least one of the transmission of a signal related to detected sensor impairment.

8. The system according to claim 1, wherein the at least first and second detector comprise at least one of an accelerometer, a hydrophone, a thermometer, a pressure sensor, and a geophone.

9. The system according to claim 1, wherein the at least one intrinsic fiber optic sensor is at least one of a fiber Bragg grating, a long fiber grating and an evanescent wave sensor, a fiber laser, a multicore fiber, Fabry Perot sensor or microstructured fiber sensors.

10. The system according to claim 1, wherein the second density region comprises a filler material having a density lower than the first density, the filler material including at least one of a group consisting of: an inert fluid, a foam, a flexible low density plastic, and a plastic grain.

11. The system according to claim 10, wherein the at least first and second detectors are arranged such that a first density region comprises the first and the second detectors and the second density region comprises a volume in between the first and the second detectors and at least partially the at least one optical fiber between the first and the second detectors.

12. A method for performing geological survey, the method comprising:
releasing an ocean bottom sensing system from a vessel, the system including a cable; and
installing the system at an ocean bottom;
wherein the cable comprises:
a cable jacket;
one or more optical fibers; and
at least a first detector and second detector enclosed by the cable jacket, each of the at least first and second detectors are provided by at least one intrinsic fiber optic sensor and are enclosed by the cable jacket, wherein each detector communicates with one of the one or more optical fibers, via the one optical fiber, and configured to receive an interrogation signal and return a response signal, for enabling interrogation of the at least intrinsic fiber optic sensor, wherein the plurality of detectors are spaced apart along a length of the cable, and wherein the detectors are radially enclosed by the cable jacket of the cable, wherein the cable in cable sections around the detectors is weighted to provide first density regions at a first density, and wherein a weight of the cable is reduced in cable sections between the detectors which provide second density regions of a second density lower than the first density, the first and second density regions thereby providing a density variation, wherein the cable jacket has a first cross-sectional diameter and substantially same outer shape at the at least first and second detectors and in between the first and second detectors, wherein installing of the cable comprises using the density variation in the cable for preferential coupling of sections containing the first and second detectors to the ocean bottom.

13. The method according to claim 12, wherein the system further comprises a data acquisition unit and wherein the data acquisition unit is weighted prior to release, and wherein the releasing is performed by first releasing the data acquisition unit for use thereof as an anchor for the system, and wherein further releasing the system from a vessel, wherein the method further comprises linearizing a deployment path of the system using the data acquisition unit as the anchor to incur drag at one end of the system thereby increasing cable tension during the deployment of the system.

14. The method according to claim 12, wherein the ocean bottom sensing system comprises a plurality of systems, and wherein, prior to the releasing, the cable is interconnected with one or more other cables by one or more interconnection ropes for forming a system chain.

15. The method according to claim 12, further comprising retrieving the ocean bottom sensing system by the vessel by:
transmitting, by the vessel, a release signal to the system for the activation of a retrieval mechanism;
activating the retrieval mechanism;
releasing a buoyancy element;
locating, from the vessel, the buoyancy element released by the system; and
retrieving the system via a rope attached to the buoyancy element and the system.

* * * * *